Patented Mar. 5, 1929.

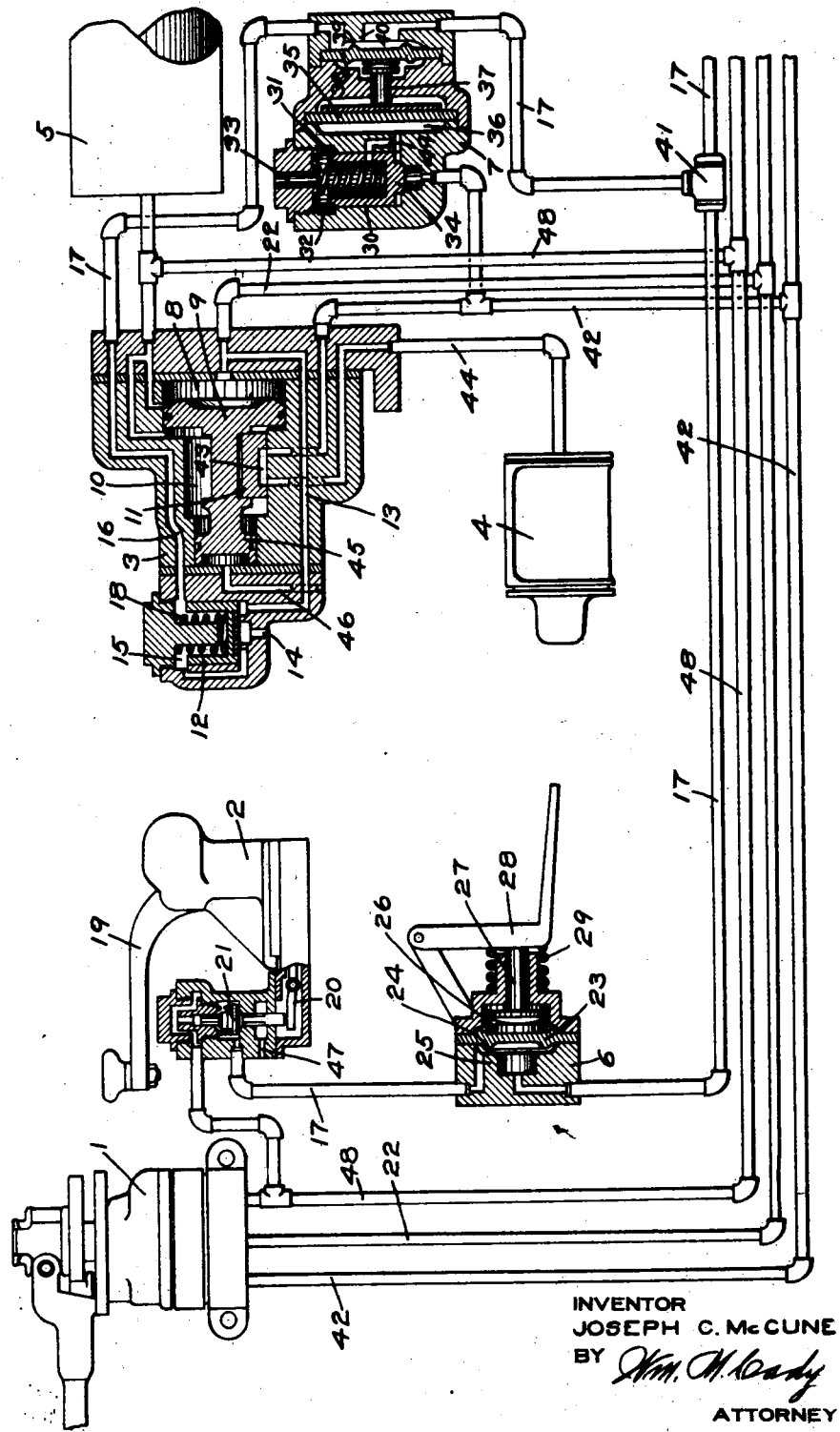

1,703,892

UNITED STATES PATENT OFFICE.

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed September 19, 1927. Serial No. 220,322.

This invention relates to fluid pressure brakes of the type in which the brakes are automatically applied when the operator becomes incapacitated and releases a controlling member.

With fluid pressure brakes of the above type, it has heretofore been proposed to provide means for preventing an automatic application of the brakes upon release of the controlling member, if the operator first makes an application of the brakes.

The principal object of my invention is to provide improved means for preventing an automatic application of the brakes when the controlling member is released which will prevent possible leakage and which can be cheaply manufactured.

In the accompanying drawing, the single figure is a diagrammatic view, partly in section, of a safety fluid pressure brake equipment embodying my invention.

As shown in the drawing, the equipment may comprise a brake valve device 1, a safety controller handle device 2, an emergency valve device 3, a brake cylinder 4, and a main reservoir 5 of the usual construction, and, according to my invention, a foot valve device 6 and a cut-off valve device 7.

The emergency valve device 3 comprises a casing having a piston chamber 8 connected to brake pipe 22 and containing piston 9 and a valve chamber 10 connected to the main reservoir 5 and containing a slide valve 11 adapted to be operated by piston 9. A relay valve 12 is also provided, which controls the venting of fluid from piston chamber 8 through passage 13 to an exhaust port 14. The chamber 15 at the opposite side of the valve is connected by passage 16 to the safety control pipe 17 and said valve is subject to the pressure of a coil spring 18.

The safety controller handle device comprises a controller handle 19 movable vertically for operating a lever 20, one end of which is adapted to engage the stem of a double beat pilot valve 21.

The above apparatus is of the usual character as heretofore employed in a safety car control equipment. According to my invention, a foot valve device 6 is employed which comprises a casing containing a flexible diaphragm 23 which operates as a valve and for this purpose is provided with a seat rib 24 adapted to engage a seat 25 and controlling communication from the pilot valve 21, through the safety control pipe 17. A disk 26 engages one side of the diaphragm 23 and the head of a stem 27 engages said disk. A foot operated lever 28 engages the end of the stem 27 and the lever is urged away from the stem by a spring 29.

A cut-off valve device 7 is provided comprising a casing containing a valve piston 30 subject to the pressure of a coil spring 31 and having chamber 32 at one side open to the atmosphere by way of port 33. The opposite side of the valve piston is provided with a valve 34. The casing also contains a flexible diaphragm 35 having a chamber 36 at one side, the pressure in which is controlled by the valve piston 30.

At the opposite side, said diaphragm engages one end of a stem 37, the head of which engages one side of a flexible diaphragm 38, said diaphragm acting as a valve and for this purpose is provided with a seat rib 39 adapted to engage a seat 40. Said valve diaphragm 38 is adapted to control communication through the safety control pipe 17.

The particular equipment shown is of the double end type having a brake valve 1, and a safety controller handle 2 at each end of the car and also a foot valve device 6. Only one cut-off valve device 7 is required for a car, and a double check valve device 41 controls communication through the safety control pipe 17 to opposite ends of the car.

A straight air pipe 42 leads from the brake valve devices 1 to the seat of the emergency slide valve 11 and in normal release position of the slide valve, said pipe is connected through cavity 43 with the brake cylinder pipe 44.

In operation, the valve chamber 10 and the piston chamber 8 of the emergency valve device are charged with fluid under pressure from the main reservoir 5 and the piston 9 is maintained in the normal release position shown, due to the small piston head 45 of the emergency valve device being connected to an atmospheric passage 46.

The operator normally presses down on the controller handle 19, permitting the double beat valve 21 to seat on its lower seat, in which communication from the control pipe 17 to an atmospheric port 47 is cut off.

At the same time, the upper valve is unseated, so that fluid under pressure is supplied from the main reservoir 5, through pipe 48 to the control pipe 17 and with the pedal lever 28 not subject to foot pressure, the diaphragm valve 23 is unseated, permitting flow of fluid through the control pipe 17 to the cut-off valve device 7. With no pressure in the straight air pipe 42, the valve piston 30 is held seated by spring 31, and chamber 36 is connected to the atmospheric port 33 through passage 49. The diaphragm valve 38 is thus permitted to remain unseated, so that fluid under pressure can flow through the control pipe 17 and passage 16 to the chamber 15 and the valve piston 12 is then maintained seated by said pressure and the pressure of spring 18.

If the operator should release the controller handle 19, the double beat valve 21 will be moved to its upper seat and fluid under pressure will be vented from the control pipe 17 through the atmospheric port 47. The pressure in chamber 15 of the relay valve 12 is thus vented, permitting the brake pipe pressure acting on an exposed area of the relay valve at the opposite side, to move said valve from its seat, so that fluid under pressure is then vented from the piston 9.

The piston 9 is thereupon shifted to emergency position by the fluid pressure in valve chamber 10, in which position, fluid under pressure is supplied from said valve chamber and the main reservoir 5 to the brake cylinder 4, so as to effect an emergency application of the brakes.

An emergency application of the brakes may be prevented when the operator releases the controller handle 19, if he first makes a straight air application of the brakes, in which fluid under pressure is supplied to the straight air pipe by operation of one of the brake valve devices 1, and flows thence through cavity 43 in the emergency slide valve 11 to the brake cylinder 4, to effect an application of the brakes. Fluid also flows from the straight air pipe 42 to the exposed face of the valve 34, and when the straight air pressure has been increased to a predetermined degree, the valve 34 is unseated and the valve piston 30 is moved upwardly, so that fluid under pressure is now supplied to diaphragm chamber 36.

The diaphragm 35 is moved by the pressure in chamber 36 so as to cause the diaphragm valve 38 to move to its seat and thereby cut-off communication through the control pipe 17 to the relay valve 12. It will now be evident that the operator may remove his hand from the controller handle 19 without causing an emergency application of the brakes, since the closing of the diaphragm valve 38 prevents the venting of fluid from the relay valve 12.

The operator may also prevent an emergency application of the brakes due to releasing the controller handle 19, by pressing the pedal lever 28 with his foot, so as to cause the movement of the diaphragm valve 23 to its seat. Since communication through the control pipe 17 is thus cut off, fluid will not be vented from the relay valve 12, when the operator removes his hand from the controller handle.

The use of a diaphragm valve in the foot valve device and in the cut-off valve device for controlling communication through the safety control pipe insures a tight seat and thus eliminates the possibility of leakage.

The foot valve device and the cut-off valve device are simple in construction and can be cheaply manufactured and in the case of a double end equipment, only one cut-off valve device is required.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake, the combination with a control pipe and means operated upon release by the operator for venting fluid under pressure from said pipe to effect an application of the brakes, of manually controlled means for supplying fluid under pressure to apply the brakes, a diaphragm acting as a valve for controlling communication through said pipe, and means operated by fluid supplied in manually applying the brakes for effecting the operation of said diaphragm.

2. In a fluid pressure brake, the combination with a control pipe and means operated upon release by the operator for venting fluid under pressure from said pipe to effect an application of the brakes, of manually controlled means for supplying fluid under pressure to apply the brakes, a diaphragm acting as a valve for controlling communication through said pipe, a movable abutment operated by fluid under pressure for operating said diaphragm, and means operated by fluid under pressure supplied in manually applying the brakes for supplying fluid under pressure to said diaphragm.

3. In a safety car control equipment, the combination with a control pipe, a reduction in pressure in which is adapted to effect an application of the brakes, of a flexible diaphragm having a seat rib movable to a seat for closing communication through said pipe and means for operating said diaphragm.

4. In a safety car control equipment, the combination with a control pipe, a reduction in pressure in which is adapted to effect an application of the brakes, of manually controlled means for applying the brakes, a flexible diaphragm operative as a valve for controlling communication through said pipe, means for operating said diaphragm to close said communication upon applying the brakes manually, a second flexible diaphragm acting as a valve for controlling communication through said pipe, and foot controlled means for operating said second diaphragm.

5. In a safety car control equipment, the combination with a control pipe, a reduction in pressure in which is adapted to effect an application of the brakes, of manually controlled means for applying the brakes, a flexible diaphragm operative as a valve for controlling communication through said pipe, means for operating said diaphragm to close said communication upon applying the brakes manually, additional flexible diaphragms acting as valves for controlling communication through said pipe, one at each end of the car, and foot controlled means for operating each additional diaphragm.

In testimony whereof I have hereunto set my hand.

JOSEPH C. McCUNE.